US010607440B2

(12) United States Patent
Jacobson

(10) Patent No.: US 10,607,440 B2
(45) Date of Patent: Mar. 31, 2020

(54) BLACKJACK SYSTEM AND METHOD OF PLAYING THE SAME

(71) Applicant: Mark H. Jacobson, North Hollywood, CA (US)

(72) Inventor: Mark H. Jacobson, North Hollywood, CA (US)

( * ) Notice: Subject to any disclaimer, the term of this patent is extended or adjusted under 35 U.S.C. 154(b) by 0 days.

(21) Appl. No.: 16/019,492

(22) Filed: Jun. 26, 2018

(65) Prior Publication Data

US 2018/0374297 A1 Dec. 27, 2018

Related U.S. Application Data

(60) Provisional application No. 62/525,029, filed on Jun. 26, 2017.

(51) Int. Cl.
*G06F 17/00* (2019.01)
*G07F 17/32* (2006.01)

(52) U.S. Cl.
CPC ...... *G07F 17/3223* (2013.01); *G07F 17/3209* (2013.01); *G07F 17/3272* (2013.01); *G07F 17/3293* (2013.01)

(58) Field of Classification Search
None
See application file for complete search history.

(56) References Cited

U.S. PATENT DOCUMENTS 6,517,437 B1 * 2/2003 Wells .................. G07F 17/3211 273/143 R
2005/0073102 A1 * 4/2005 Yoseloff .................. G07F 17/32 273/292
2005/0119042 A1 * 6/2005 Chamberlain .......... G07F 17/32 463/19
2007/0004491 A1 1/2007 Gioia et al.
2007/0273097 A1 11/2007 Kirkutus et al.
(Continued)

OTHER PUBLICATIONS

International Search Report and Written Opinion issued in PCT/US2018/039614, dated Sep. 12, 2018, 8 pages.

*Primary Examiner* — Paula A D'Agostino
(74) *Attorney, Agent, or Firm* — Lewis Roca Rothgerger Christie LLP

(57) ABSTRACT

A gaming system for playing a modified version of a card game among a dealer and a plurality of players utilizing respective computer systems arranged in a client-server relationship, the gaming system includes at least one server system operable to play the card game as the dealer, the at least one server system comprising a processor, and a memory storing instructions that, when executed by the processor, cause the processor to perform operations for managing the one or more games, and a plurality of client computer systems operable by respective players, the plurality of client computer systems each comprising a display, a processor, and a memory storing instructions that, when executed by the processor, cause the processor to perform operations for receiving inputs from a respective player to generate game events and transmit game events over a computer network to the at least one server system, the network providing communication between the at least one server system and the plurality of client computer systems and cause the processor to operate with the plurality of client computer systems for a play of the card game.

12 Claims, 20 Drawing Sheets

(56) References Cited

U.S. PATENT DOCUMENTS

| | | | | |
|---|---|---|---|---|
| 2008/0067743 | A1* | 3/2008 | Naicker .................... | A63F 1/10 273/292 |
| 2008/0102916 | A1 | 5/2008 | Kovacs et al. | |
| 2009/0253498 | A1* | 10/2009 | Wolf ....................... | G07F 17/32 463/29 |
| 2013/0244763 | A1 | 9/2013 | Baerlocher et al. | |
| 2019/0139363 | A1* | 5/2019 | deWaal ............... | G07F 17/3267 |

* cited by examiner

160

160

160

BLACKJACK SYSTEM AND METHOD OF PLAYING THE SAME

CROSS-REFERENCE TO RELATED APPLICATION

This application claims priority to and the benefit of U.S. Provisional Patent Application No. 62/525,029, filed in the United States Patent and trademark Office on Jun. 26, 2017, the entire content of which is incorporated herein by reference.

BACKGROUND

1. Field

Embodiments of the present disclosure relate to a gaming system for playing a game, and more specifically, for playing Twenty-One (or Blackjack).

2. Description of Related Art

The game of Blackjack is well-known. Blackjack is a comparing card game between usually several players and a dealer, where each player in turn competes against the dealer, but players do not play against each other. It is played with one or more decks of 52 cards, and is one of the most widely played casino games in the world.

Because Blackjack is typically played with several players and a dealer, with each player receiving their respective cards in succession, the acts of an upstream player will have a significant impact on which card(s) are dealt to the downstream player. For example, if a first player hits, the first player is dealt a first card which is then effectively removed from play for a second player whose cards are dealt after the first player. Because the first card is dealt to the first player when she hits, the second player can no longer receive the first card. As such, the order of players at a Blackjack table can significantly impact which card(s) each player is dealt and therefore each player's success. Further, an inexperienced or poorly skilled upstream player might make an unorthodox decision to hit, stay, or split, which can significantly impact the downstream players' hands. Many blackjack players become irritated when another player at the table plays his hand in a manner that affects the cards that follow and in a manner that does not conform to accepted gameplay principles. For example, a less experienced player might "split" two cards having a value of 10, which uses 2 or more cards from the deck, as opposed to "standing" on the hand dealt (totaling 20). If the dealer then "hits" and reaches a good hand where otherwise she would have "busted," other players at the table may become frustrated with the player who split the two cards having a value of 10.

Online and electronic versions of Blackjack are also known, but apply the same ruleset described above, or each player plays an individual game with an individual dealer whose hand and card order differs from any other players engaged in the online or electronic version of Blackjack.

In addition, physical constraints to a Blackjack table limit the number of players that can play at any particular table at a Casino, as the addition of players can limit a dealer's ability to ensure players are not cheating by changing their bets or swapping out cards. Further, the physical limitations of a single table or a deck of cards can limit the number of players at a Blackjack table, which can result in players at a casino opting to not play or to play other games.

As such, there is a need for an interactive system that allows for multiple players to play in the same Blackjack game, without the actions of an upstream player impacting the downstream player's hand.

SUMMARY

According to embodiments of the present invention, a game (e.g., a Blackjack game) is played with a dealer and one or more players concurrently or simultaneously. As such, more hands may be dealt in a same amount of time as a traditional game of Blackjack with successive betting and hitting.

According to embodiments of the present invention, each player's decision during gameplay and resulting hand is unaffected by the play of another player. Many players do not like the outcome of a hand to be determined by other players. According to embodiments of the present invention, the game format allows for each player to play against the dealer, without the decisions of others impacting the hand of the player, and while still competing against other players to win a side pot for the player who has the best series of hands, or chips after gameplay, etc.

According to embodiments of the present invention, multiple players can play a same Blackjack hand utilizing a client-server network, which allows for rapid gameplay with numerous players, resulting in greater through-put and additional hands dealt.

According to embodiments of the present invention, a gaming system for playing a modified version of a card game among a dealer and a plurality of players utilizing respective computer systems arranged in a client-server relationship includes at least one server system operable to play the card game as the dealer, the at least one server system including a processor, and a memory storing instructions that, when executed by the processor, cause the processor to perform operations for managing the one or more games, and a plurality of client computer systems operable by respective players, the plurality of client computer systems each including a display, a processor, and a memory storing instructions that, when executed by the processor, cause the processor to perform operations for receiving inputs from a respective player to generate game events and transmit game events over a computer network to the at least one server system, the network providing communication between the at least one server system and the plurality of client computer systems and cause the processor to operate with the plurality of client computer systems to for a play of the card game, the dealer dealing a first card to a player hand, a second card to a dealer hand, a third card to the player hand, and a fourth card to the dealer hand, the fourth card being concealed and the first through third cards being exposed, the player hand being allocated to each of the players at the plurality of client computer systems, determining whether each of the respective players indicated stay or hit on the player hand during a first round of gameplay and storing information in the memory according to each of the player indications, if any player indicates hit and after all of the players have indicated stay or hit for the first round, the dealer dealing a fifth card, when all players have indicated stay, the dealer revealing the fourth card, the dealer dealing a sixth card if the second card and the fourth card total less than a preselected amount, applying the fifth card to the player hand for any players who indicate hit in the first round of gameplay, not applying the fifth card to the player hand for any players who indicate stay in the first round of gameplay, and applying the fifth card to the dealer hand for any players who indicate stay and when the sixth card and the fourth card total less than the preselected amount, if at least one player indicates hit after a preceding card is dealt to the at least one player, the dealer dealing additional cards, each subsequent card being applied to the player hand, if the dealer hand totals less than the preselected amount, the dealer dealing additional cards, each subsequent card being applied to the dealer hand, and comparing a value of cards in the dealer hand to a value of cards in the player hand for each of the players.

According to embodiments of the present invention, the at least one server system may be configured to manage one or more games by storing state information regarding each of the one or more games and updating the state information in response to game events.

According to embodiments of the present invention, the state information may include an order of cards in a virtual deck, the dealer hand, the player hand, and an amount of credits belonging to each of the plurality of players.

According to embodiments of the present invention, the play of the card game may include receiving a wager from each of the players.

According to embodiments of the present invention, the card game may include a plurality of games played in succession, and a portion of the wager from each of the players may be allocated to a side pot.

According to embodiments of the present invention, the play of the card game may include storing information relating to an amount of credits earned by each of the players after each of the card games from among the plurality of card games, comparing a total amount of credits earned by each of the players after all of the card games from among the plurality of card games is complete, and awarding the side pot to one of the players from among the plurality of players with a highest total amount of credits after all of the card games from among the plurality of card games is complete.

According to embodiments of the present invention, the display may include a user interface and a screen.

According to embodiments of the present invention, the user interface may include a touchscreen.

According to embodiments of the present invention, the user interface may be configured to received one or more user inputs.

According to embodiments of the present invention, the user inputs may include a stay input, a bet input, a hit input, a split input, a double input, or an insurance input.

According to embodiments of the present invention, the user inputs each may include icons which, when engaged by the respective players, cause the processor of the respective client computer system to send a signal to the at least one server system as one of the game events.

According to embodiments of the present invention, the gaming system may include a dealer display in communication with the at least one survey system and that displays each of the cards dealt during gameplay.

According to embodiments of the present invention, the card game may include Blackjack.

BRIEF DESCRIPTION OF THE DRAWINGS

These and other features and aspects of embodiments of the present disclosure will be better understood by reference to the following detailed description, when considered in conjunction with the accompanying drawings. The same numbers are used throughout the figures to reference like features and components. The figures are schematic in nature and may not be drawn to scale.

DETAILED DESCRIPTION

Figure 1:
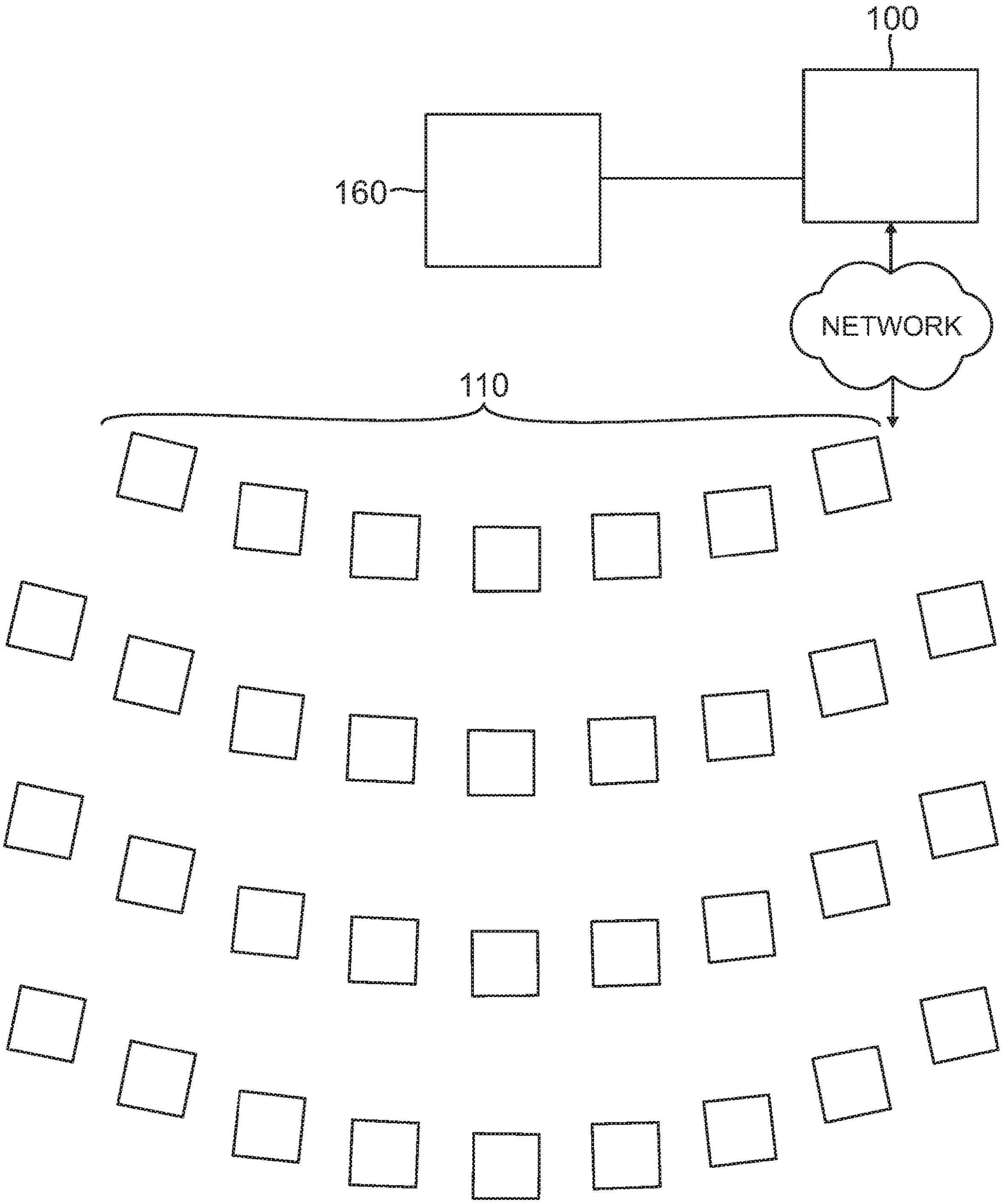
FIG. 1 is a schematic diagram of a gaming system according to one or more embodiments of the present invention.
Figure 2:
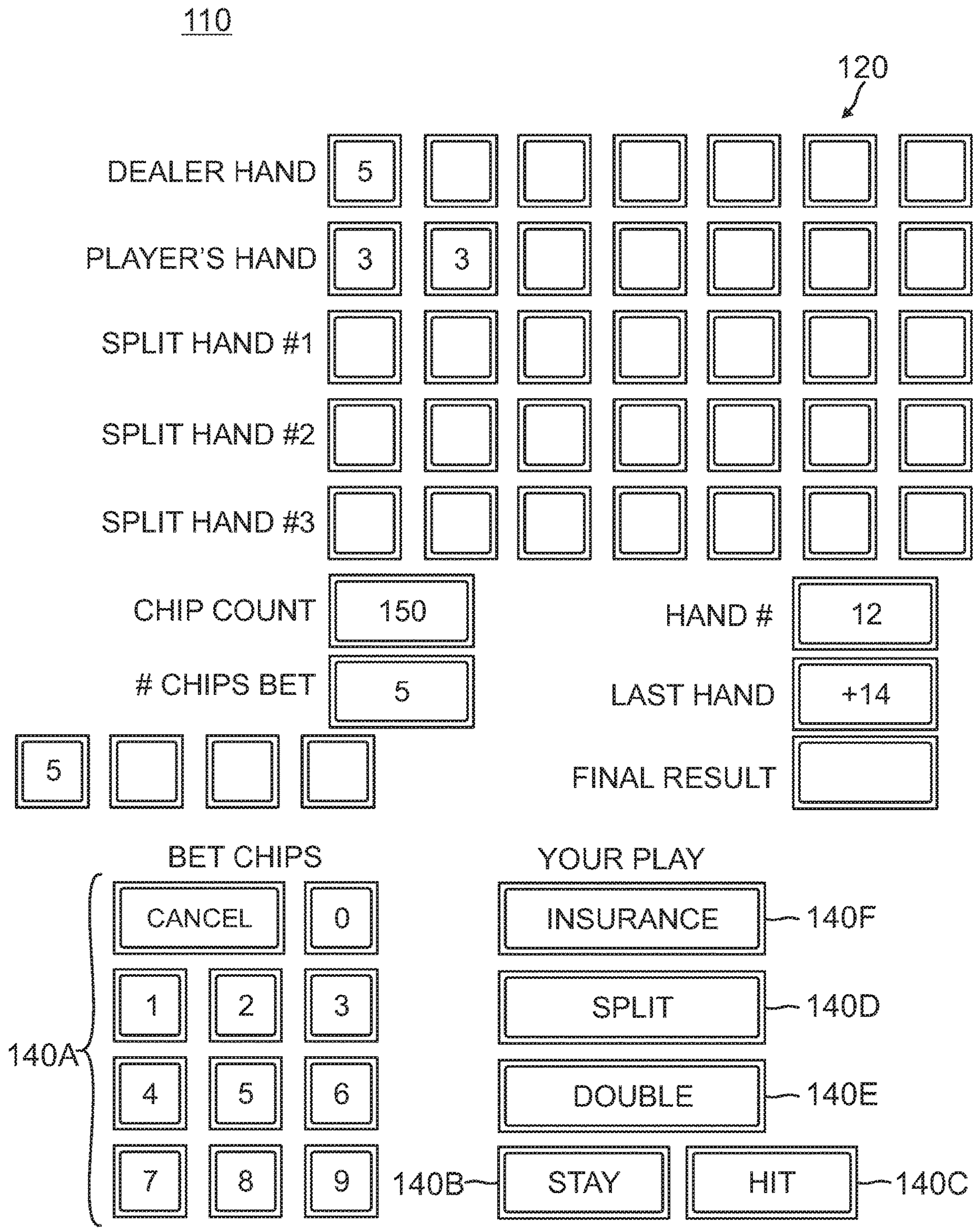
FIGS. 2-12 are schematic illustrations of a player console during a hand of play according to one or more embodiments of the present invention.
Figure 3:
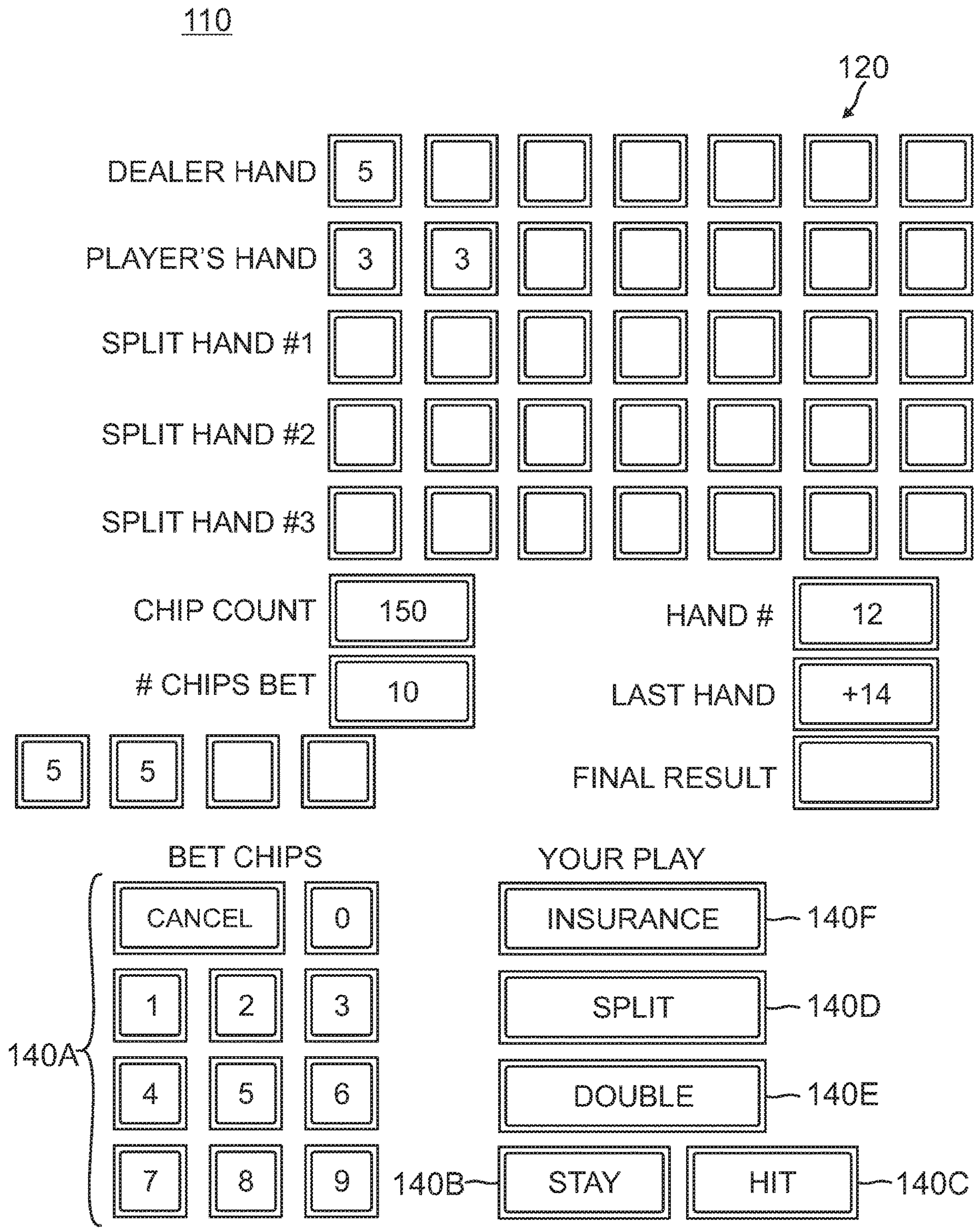
Figure 4:
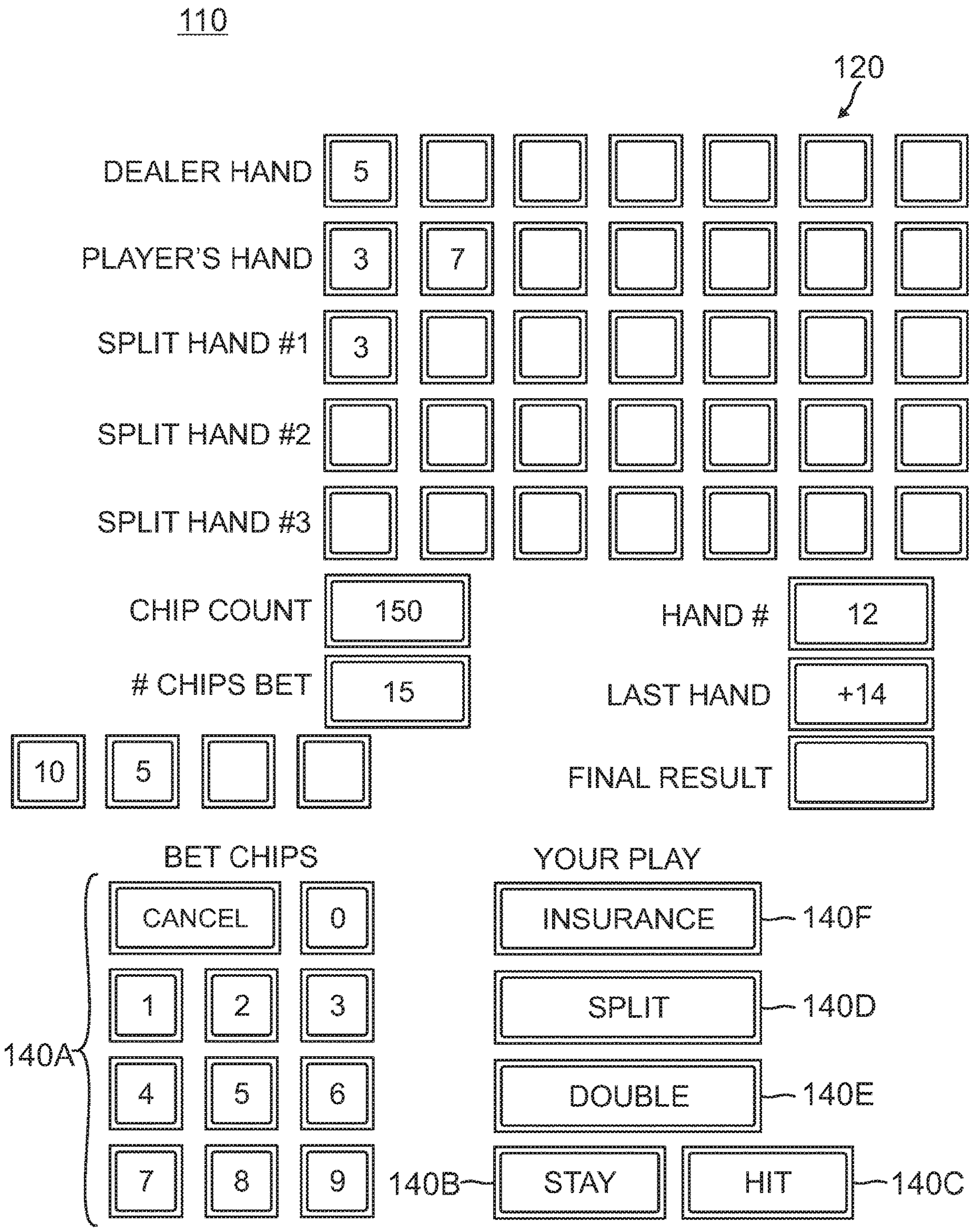
Figure 5:
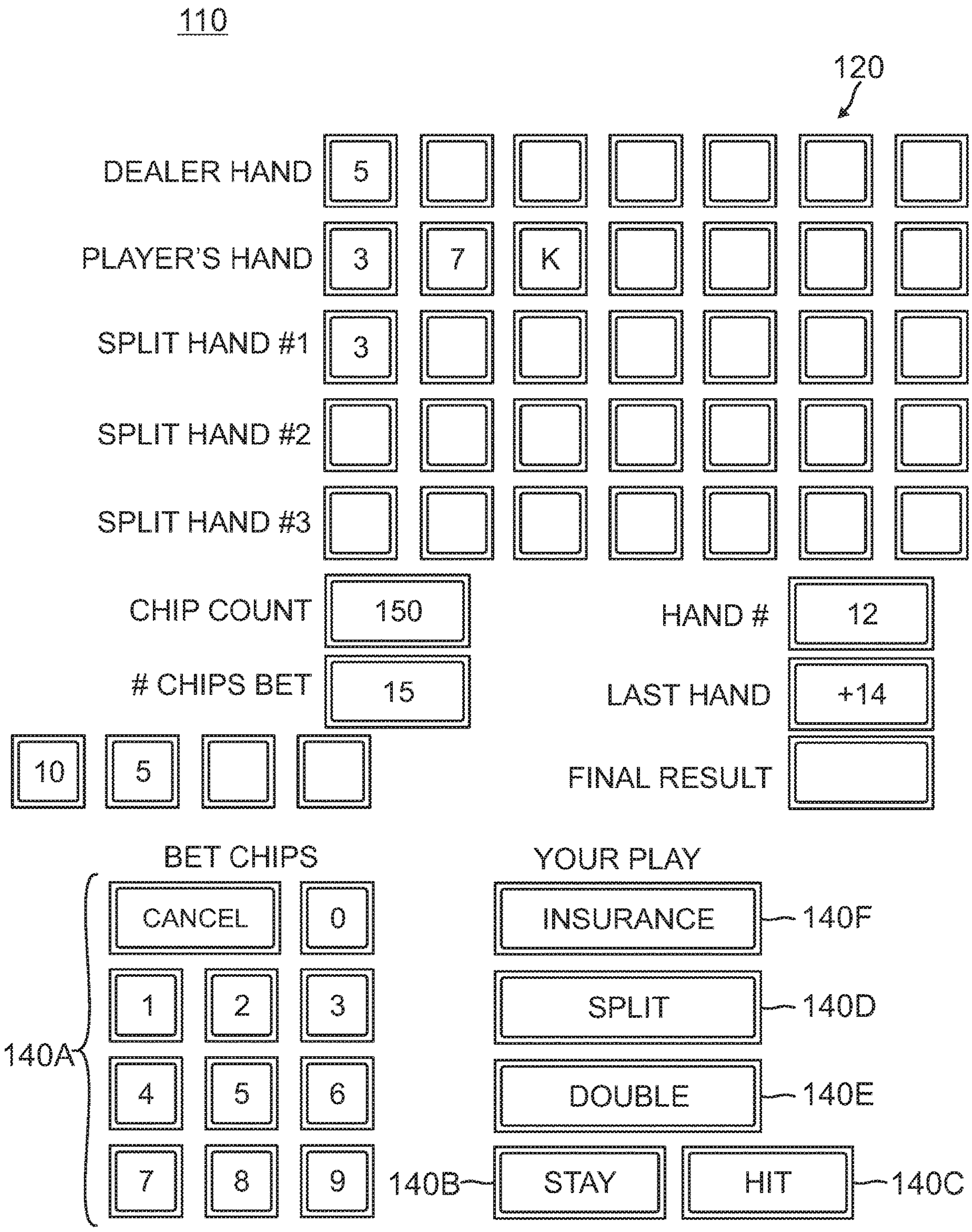
Figure 6:
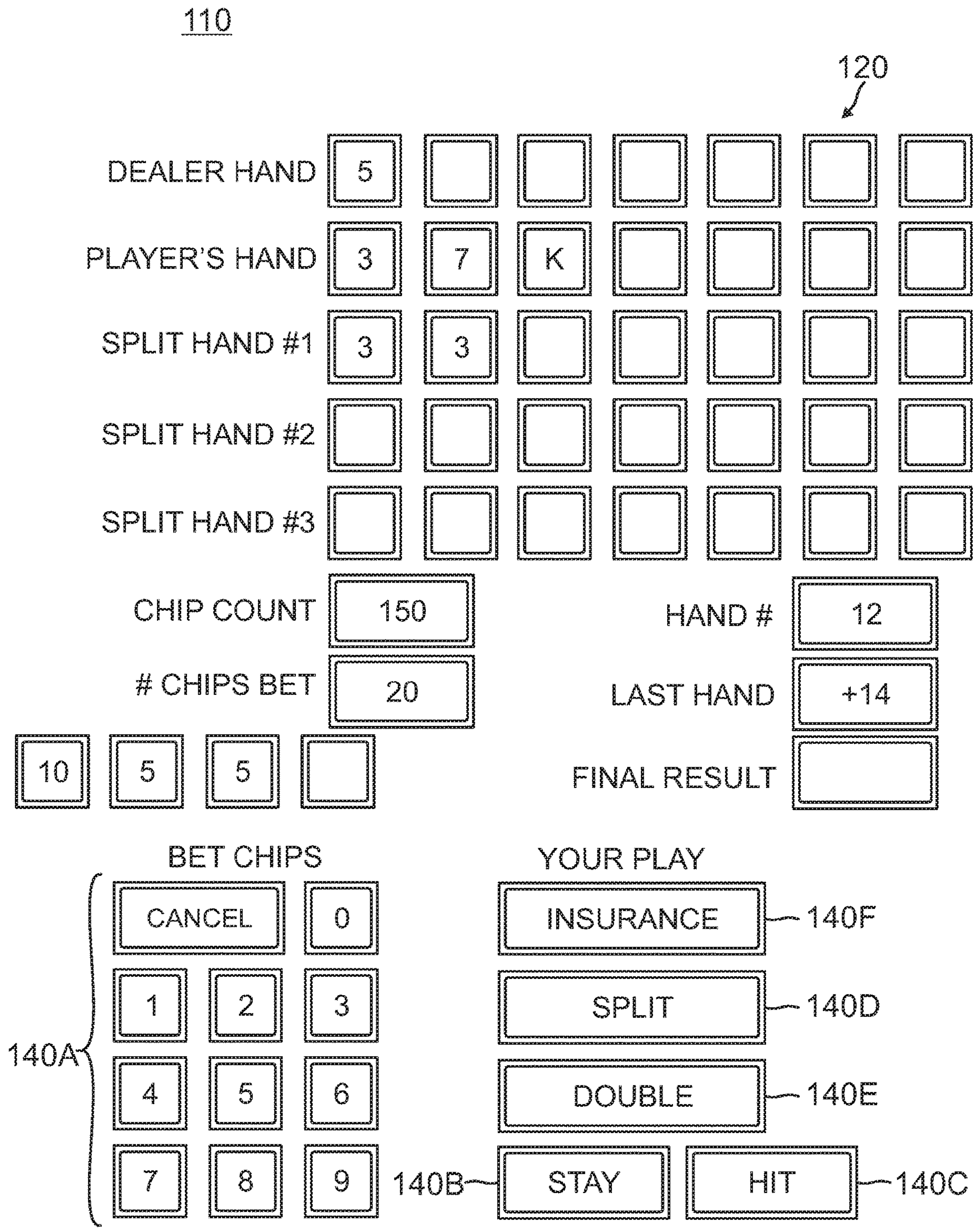
Figure 7:
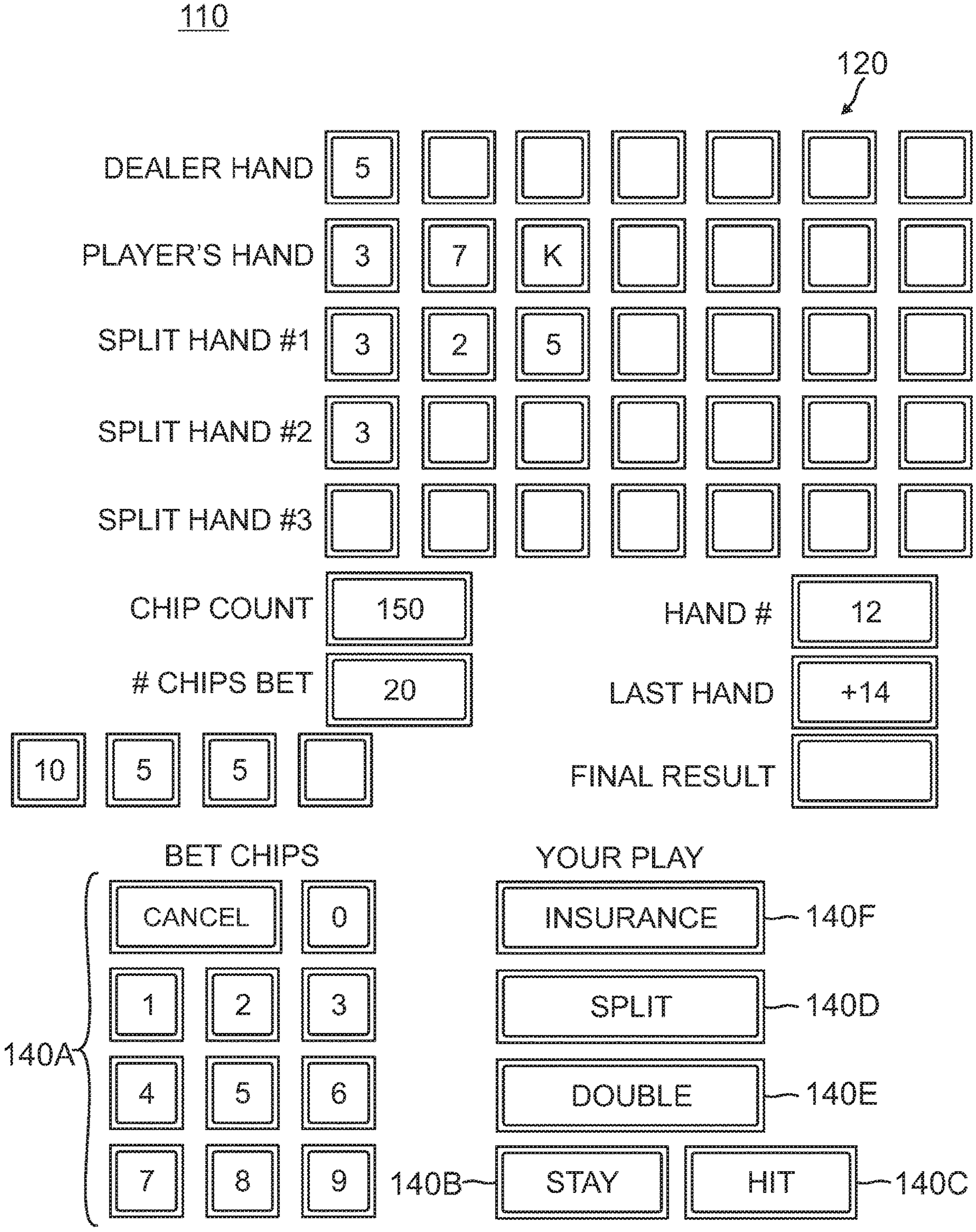
Figure 8:
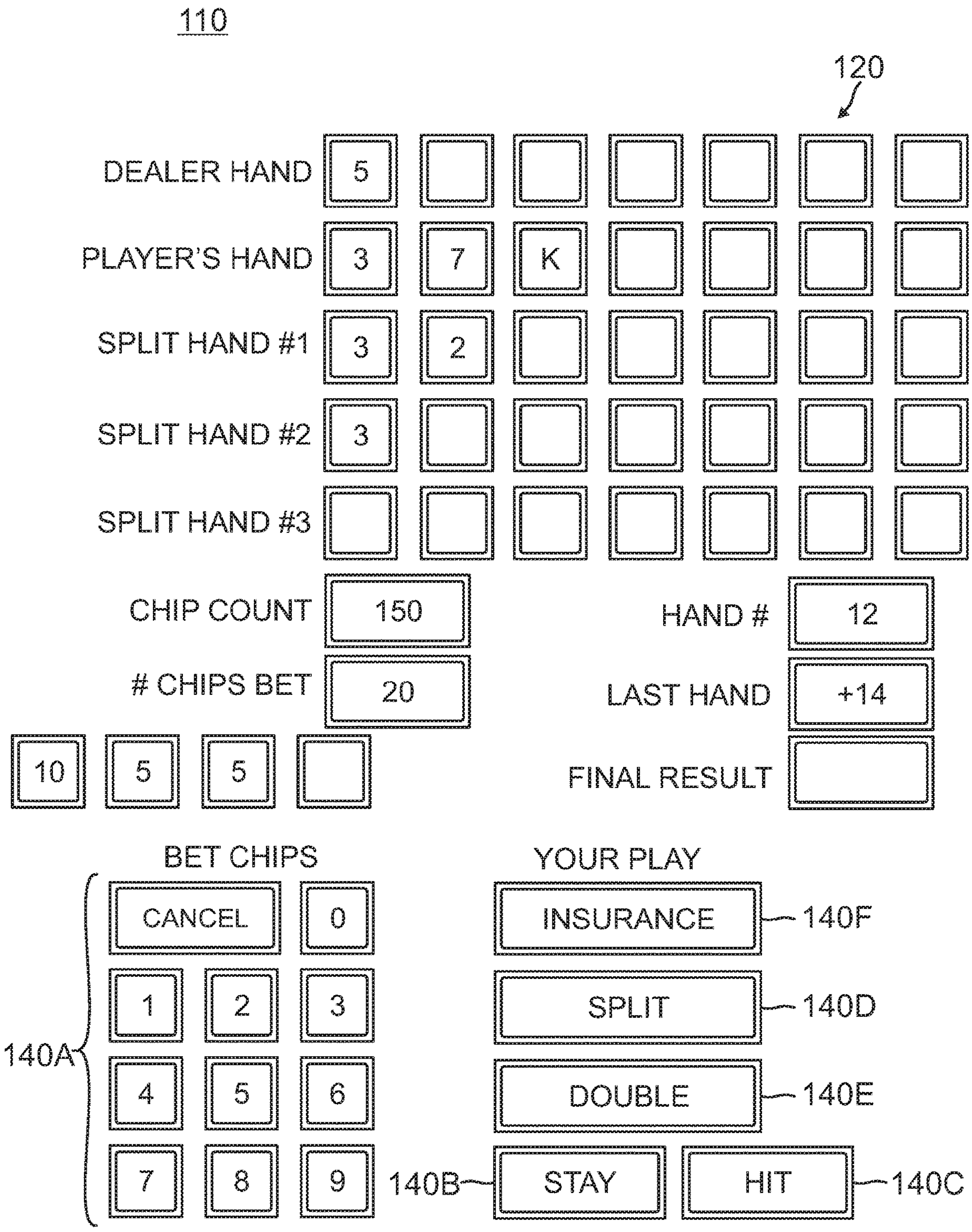
Figure 9:
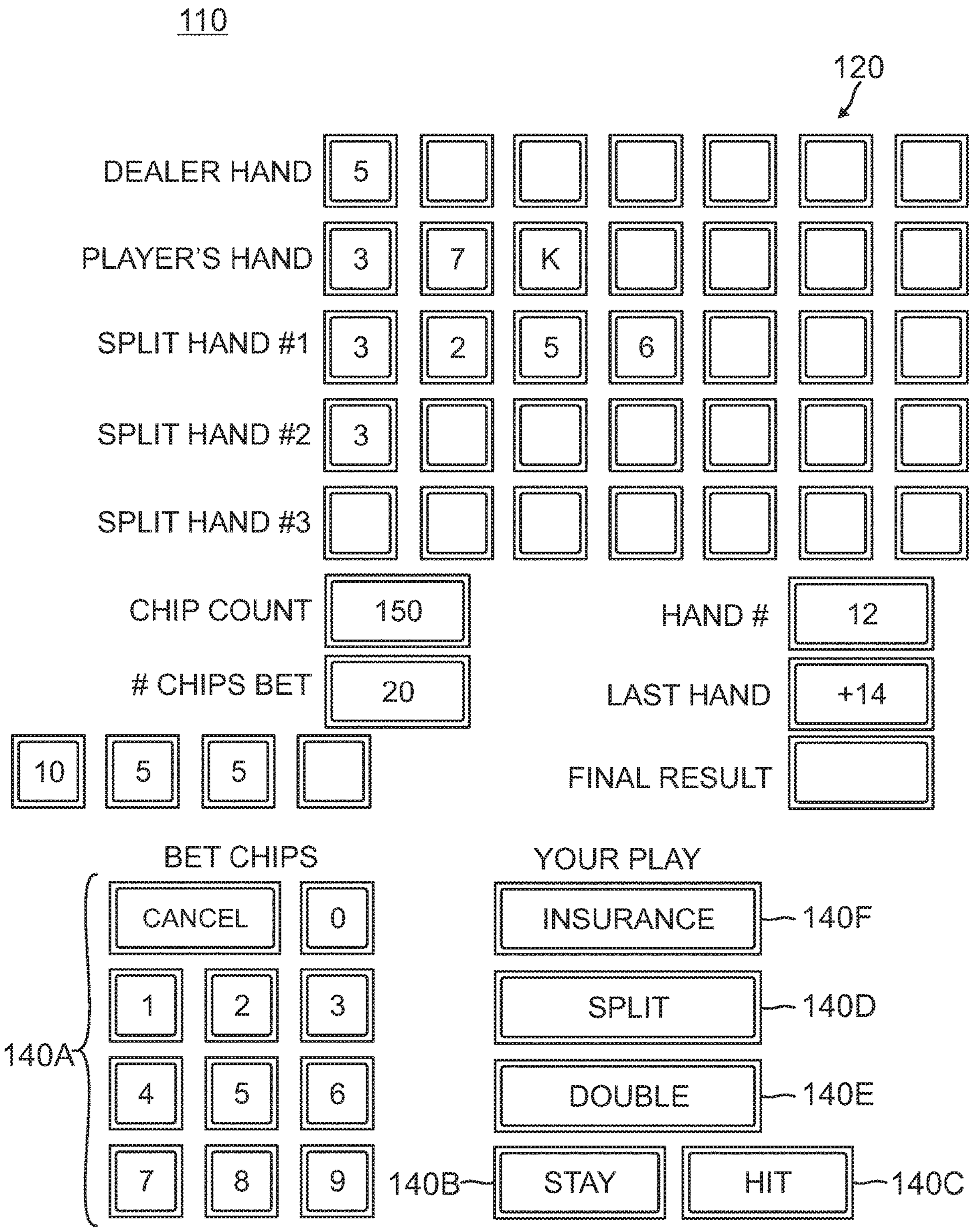
Figure 10:
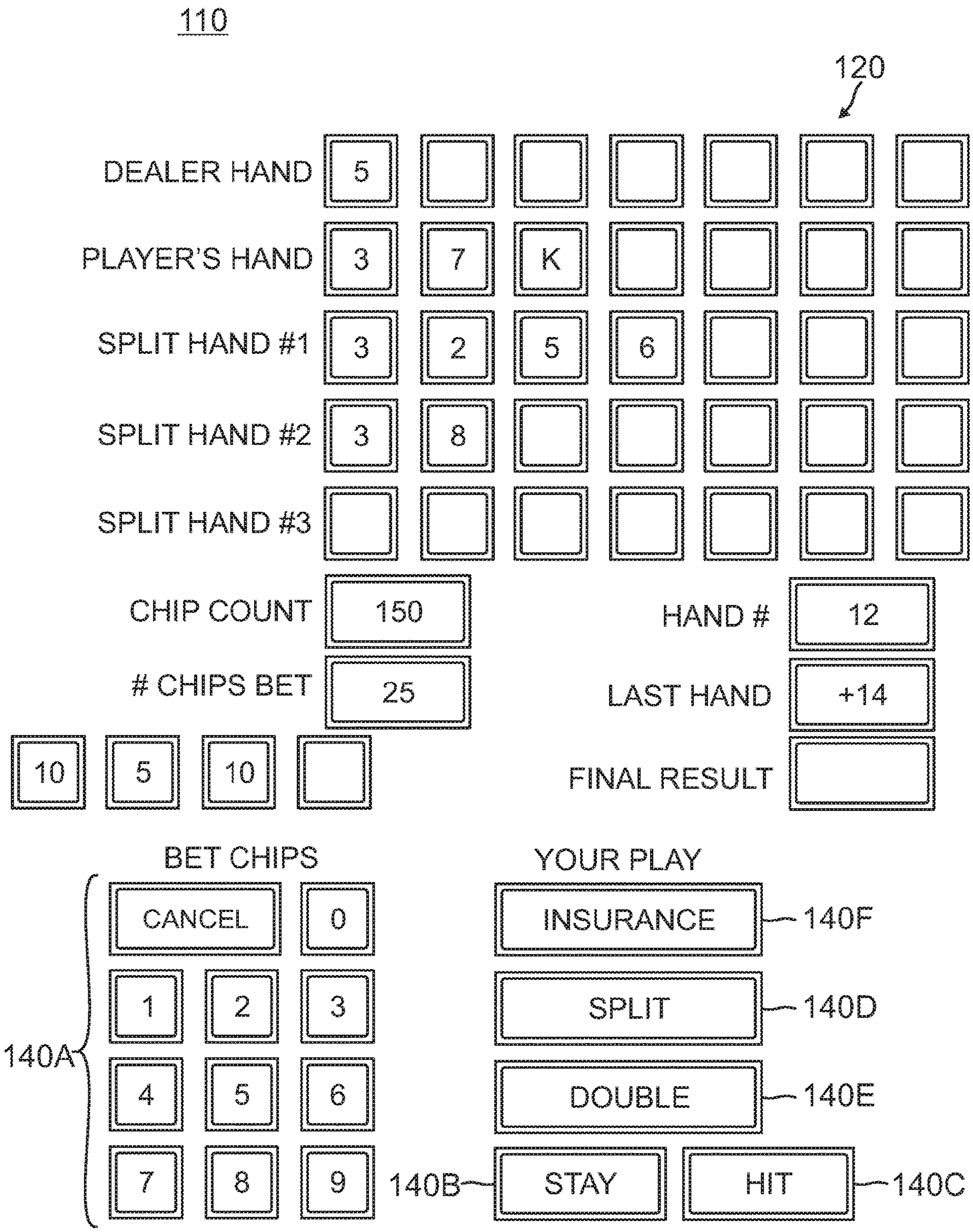
Figure 11:
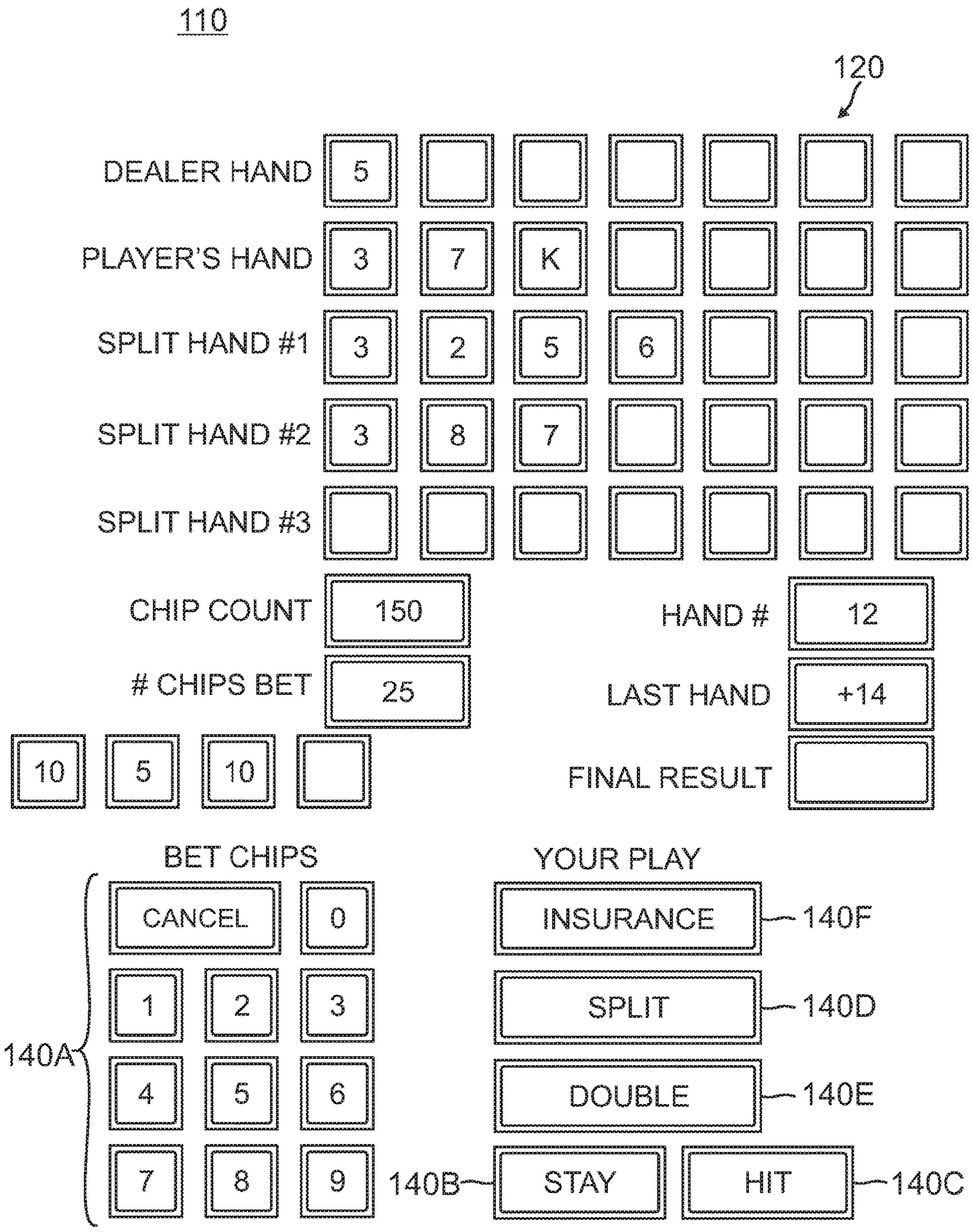
Figure 12:
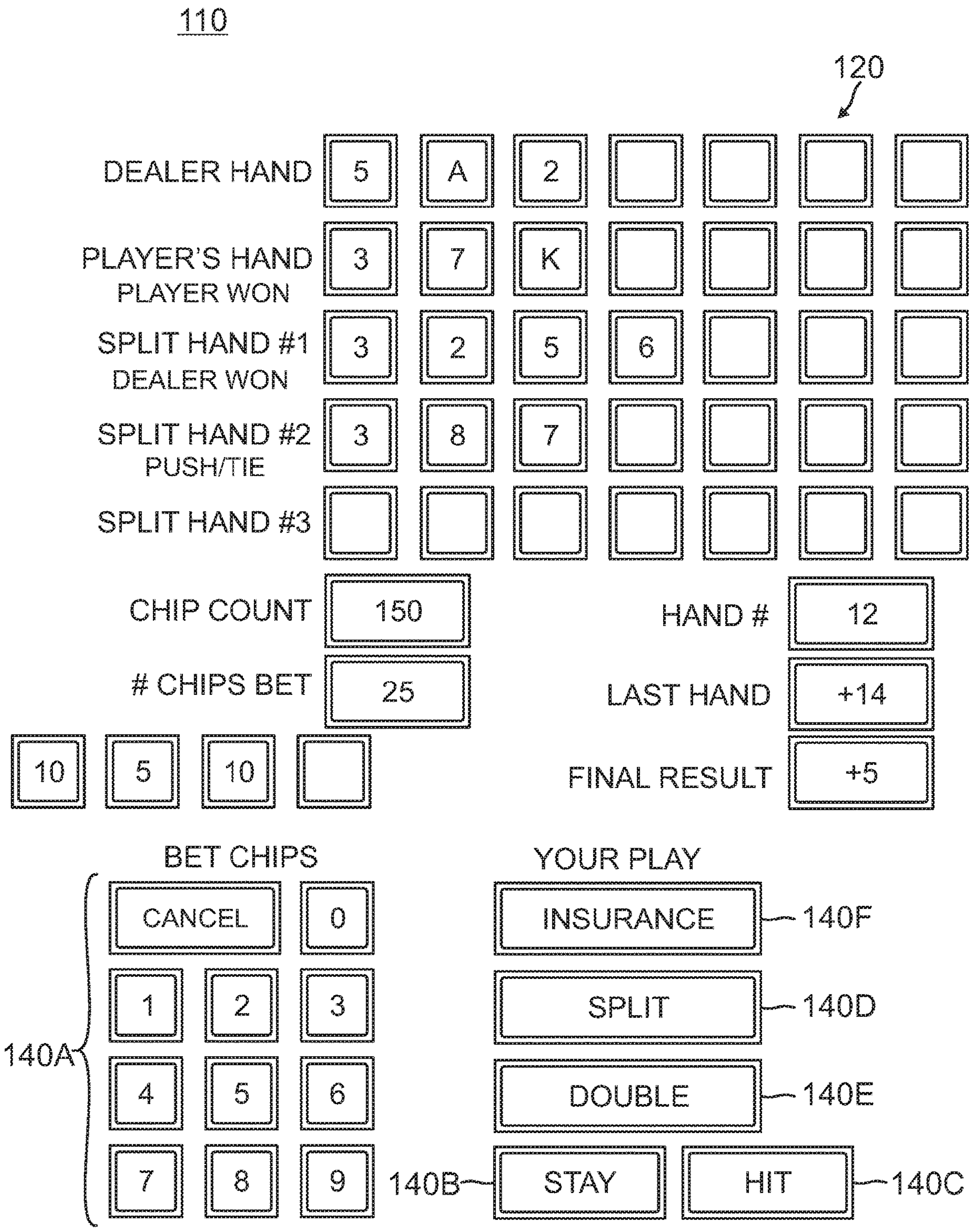
Figure 13:
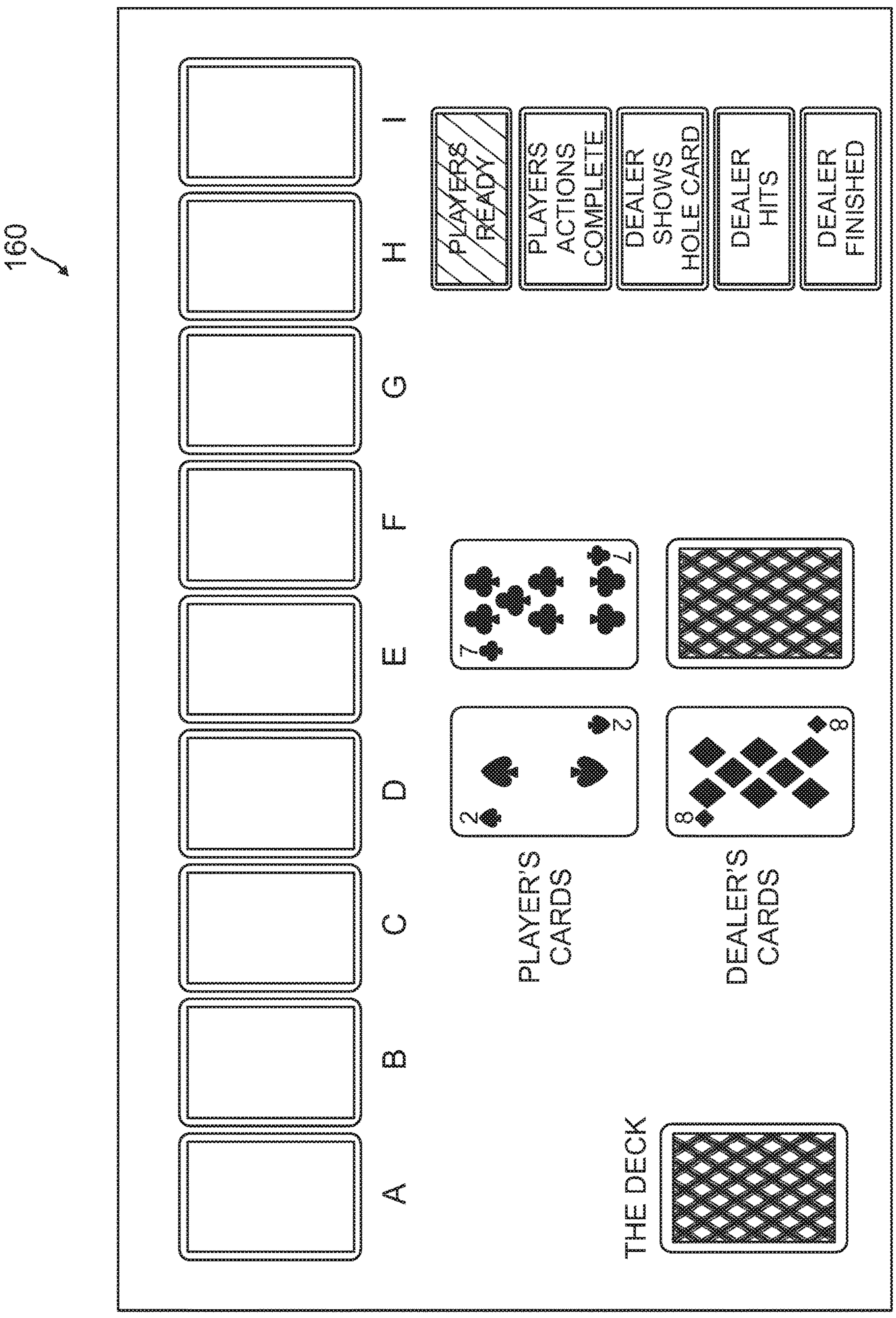
FIGS. 13-18 are schematic illustrations of a dealer screen during a hand of play according to one or more embodiments of the present invention.
Figure 14:
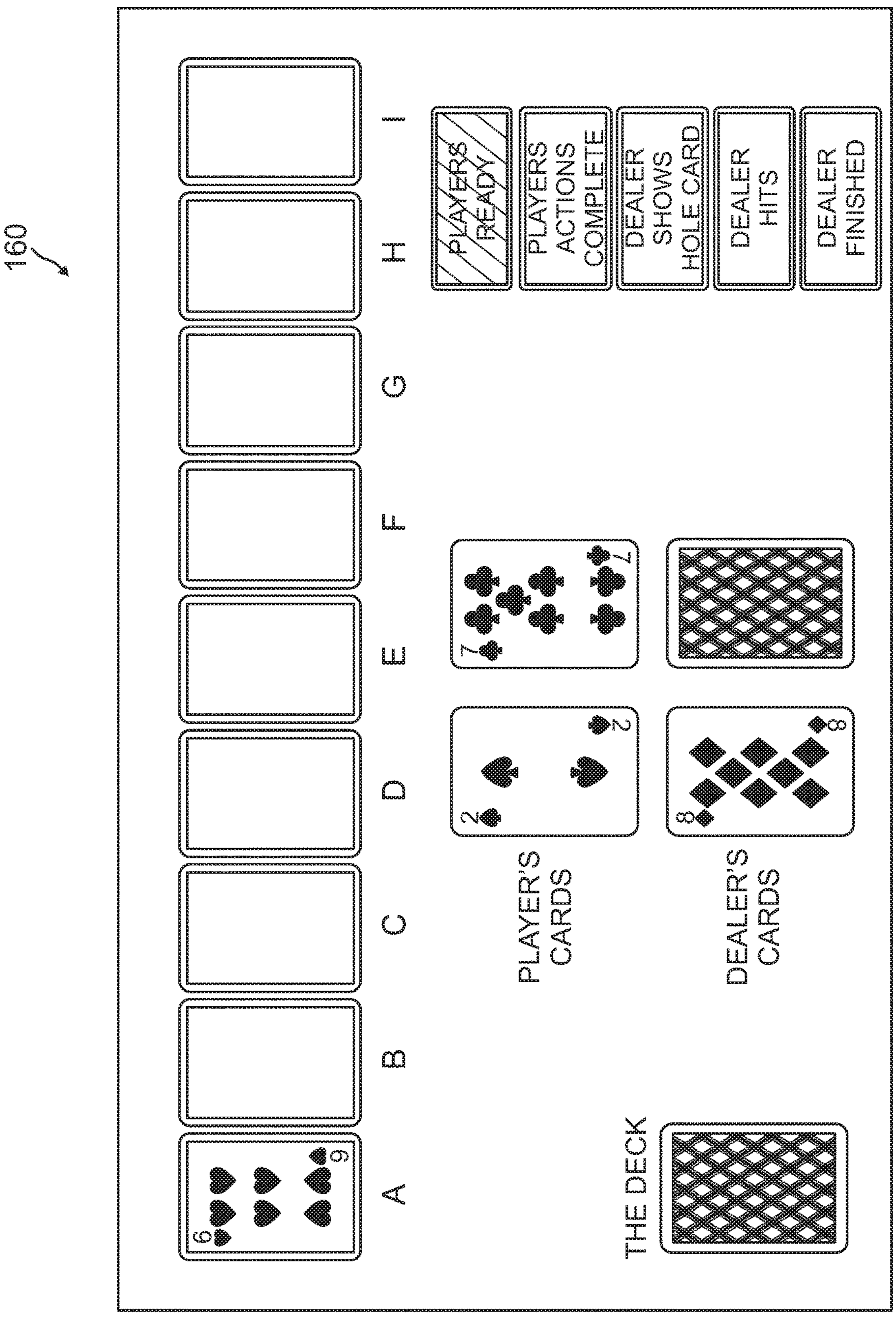
Figure 15:
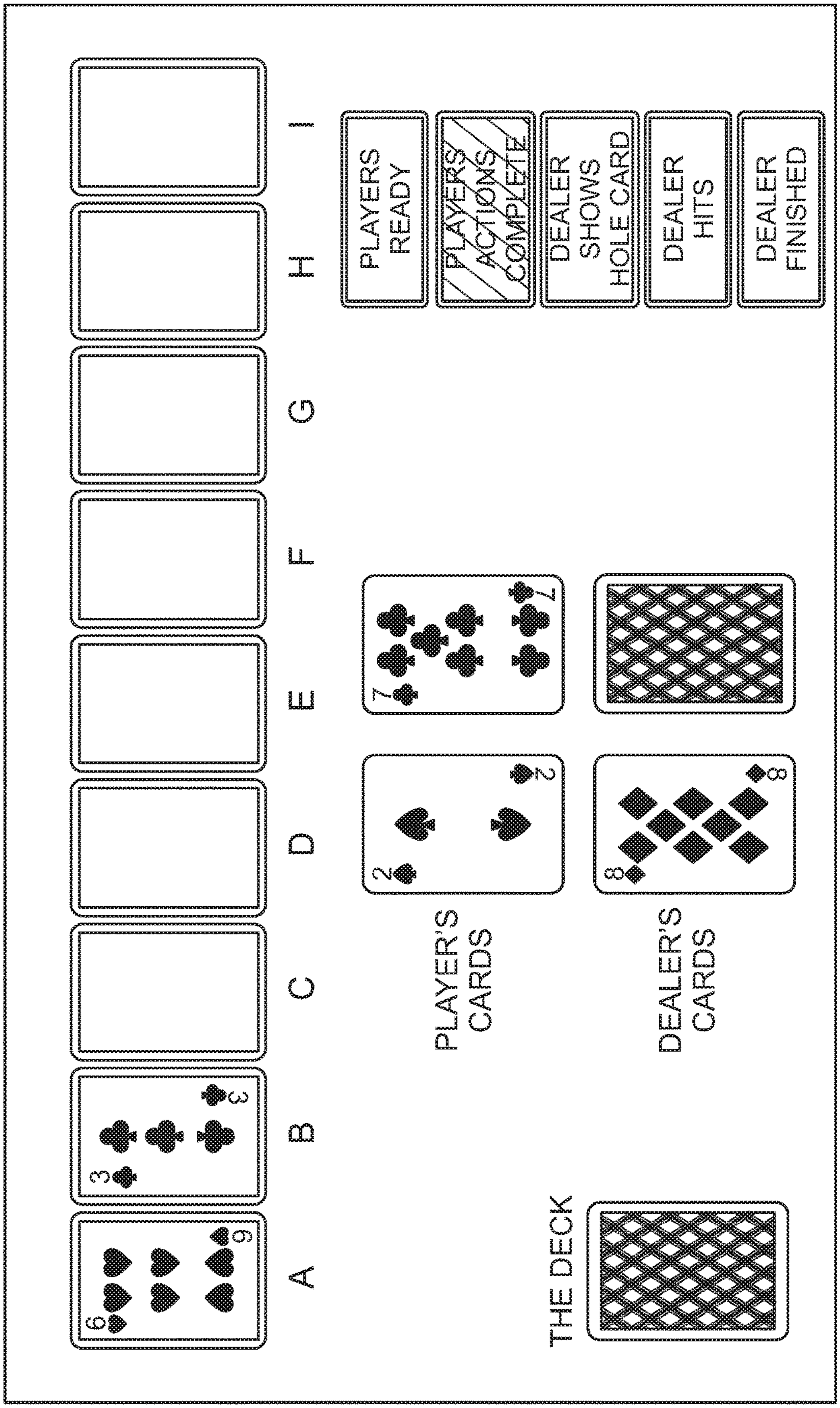
Figure 16:
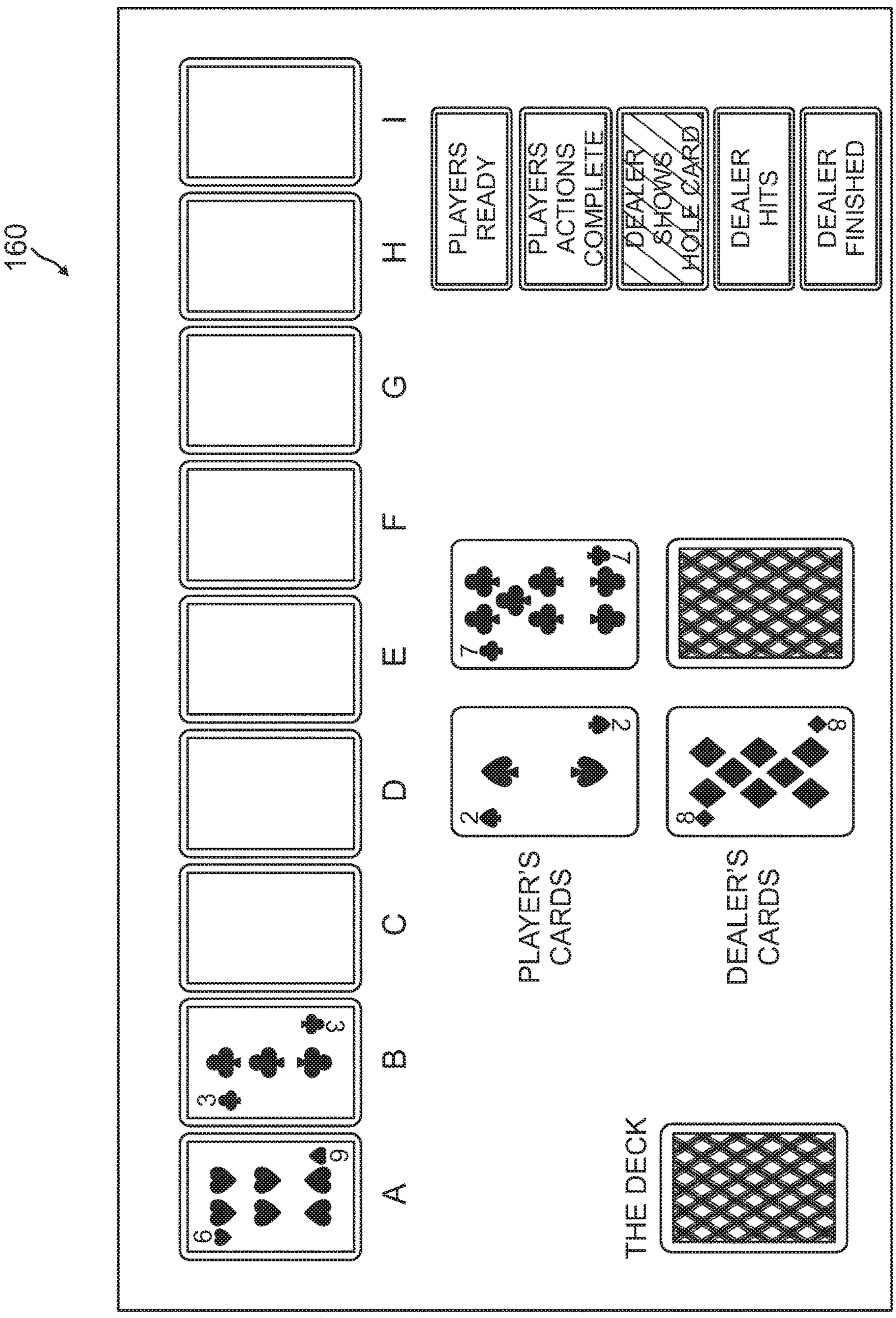
Figure 17:
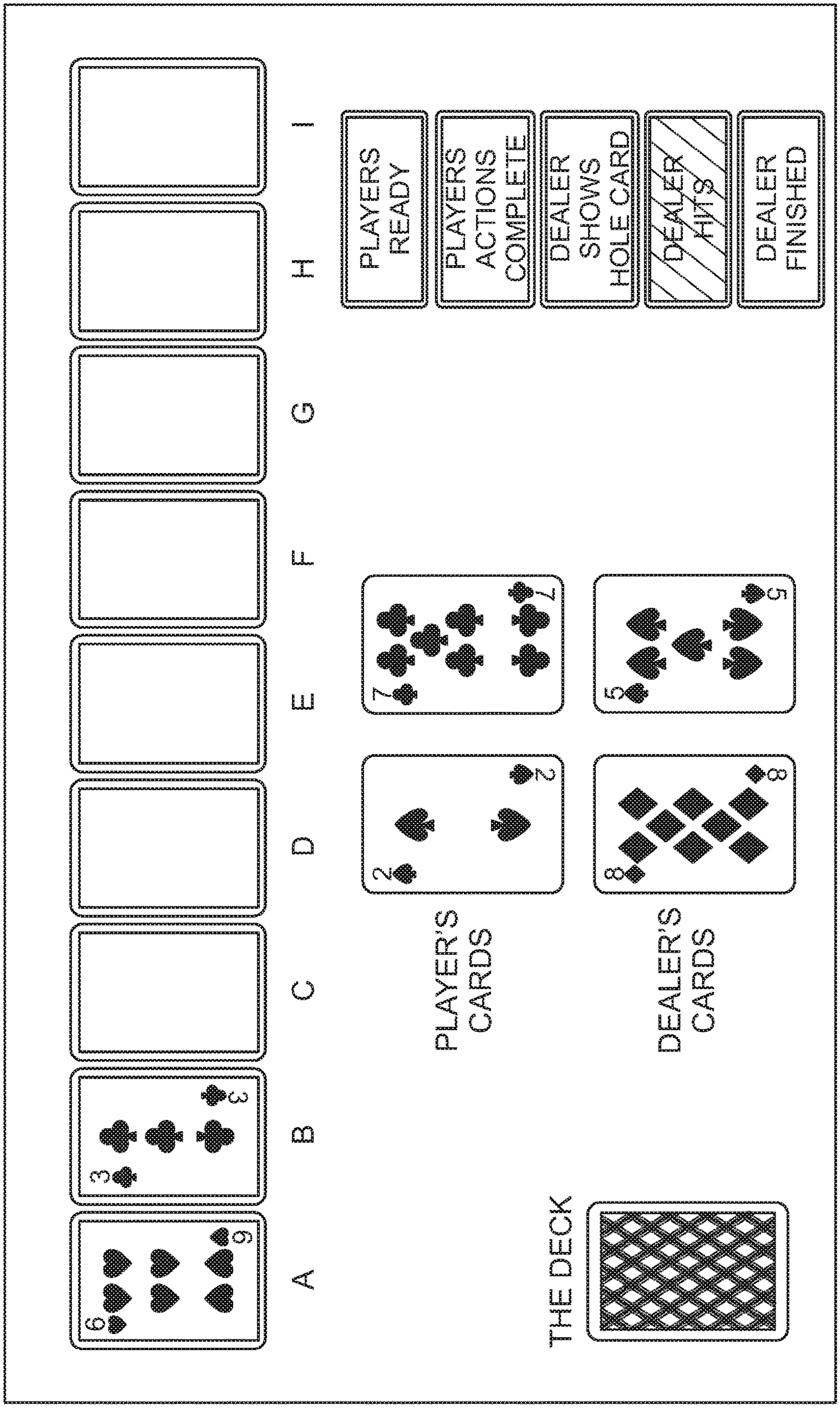
Figure 18:
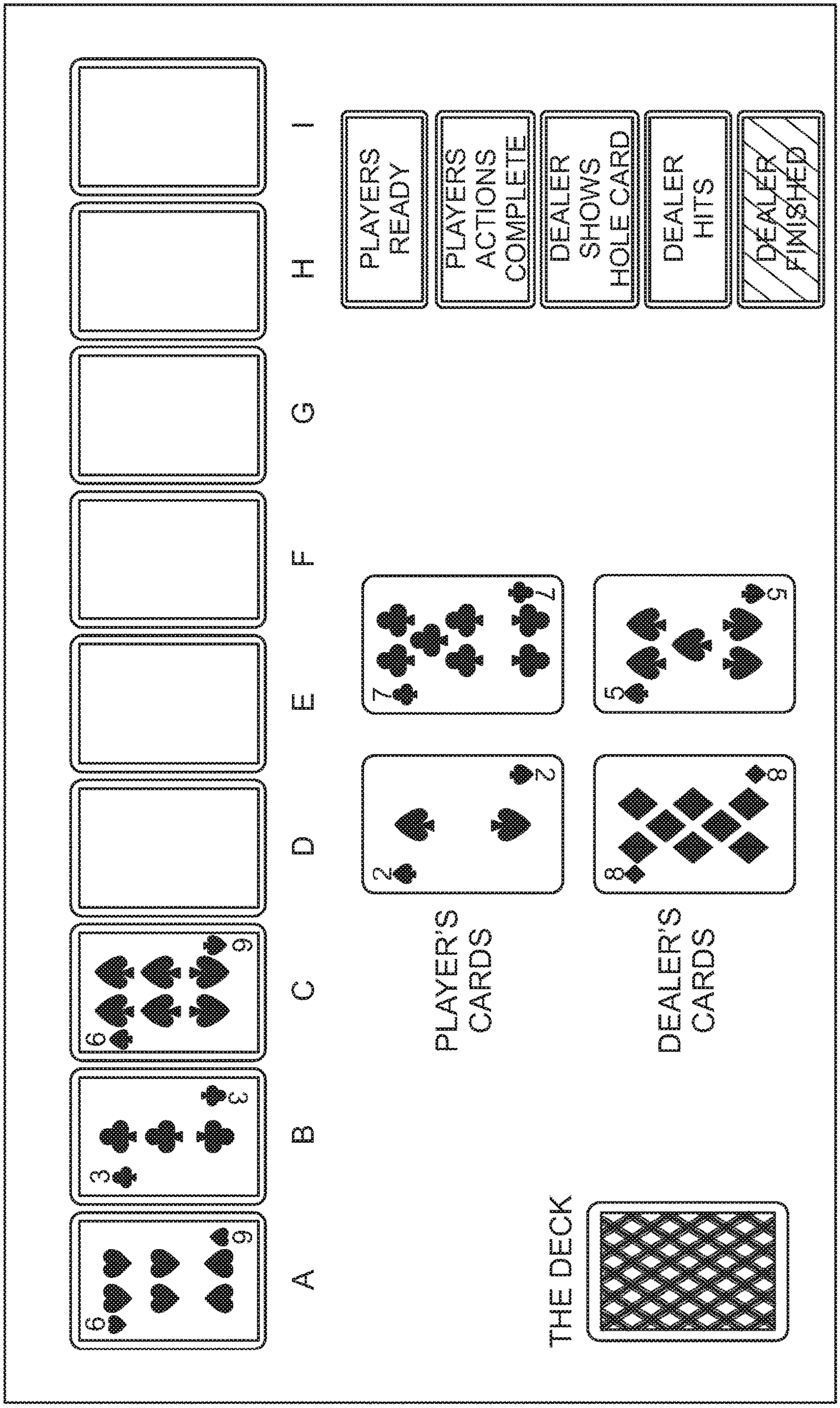
Figure 19:
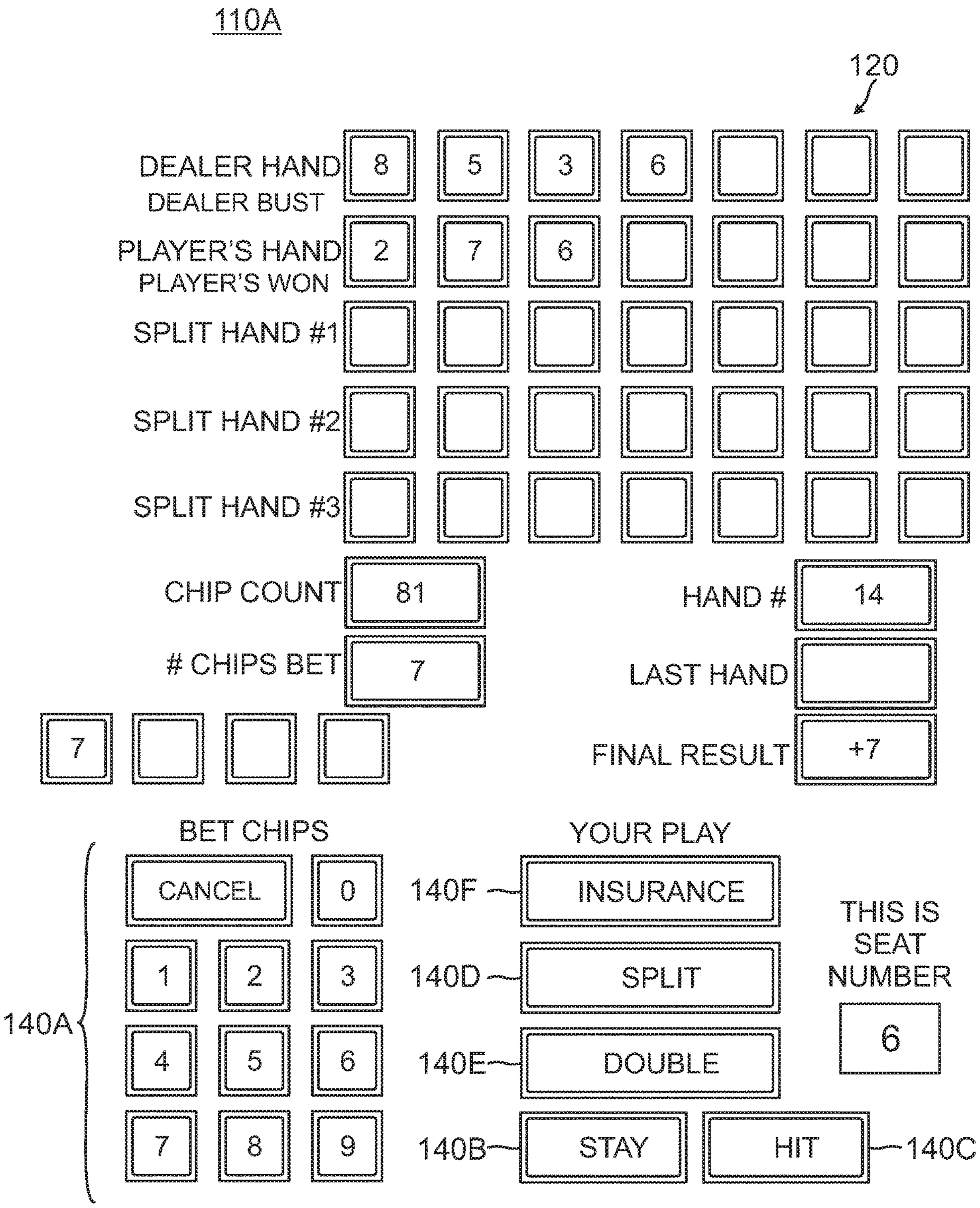
FIG. 19 is a schematic illustration of a first player console during the hand of play of FIGS. 13-18 according to one or more embodiments of the present invention.
Figure 20:
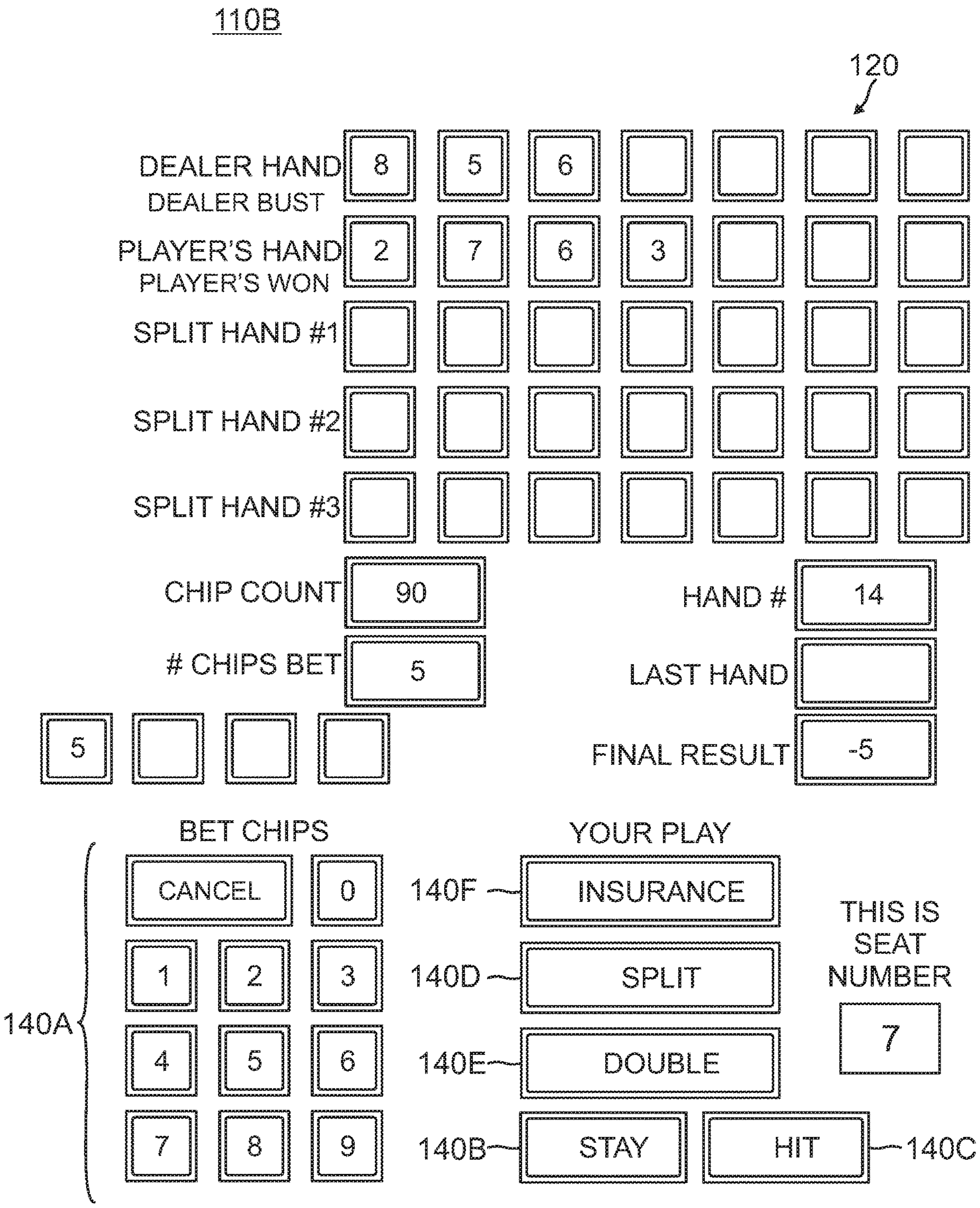
FIG. 20 is a schematic illustration of a second player console during the hand of play of FIGS. 13-18 according to one or more embodiments of the present invention.

Referring to FIG. 1, embodiments of the present disclosure relate to a gaming system 1 and a method of playing a game. According to embodiments of the present disclosure, the gaming system 1 includes a plurality of computer systems arranged in a client-server relationship. In some embodiments, one or more server computer systems (also referred to herein as "dealers," as discussed in more detail below) of the gaming system 1 are configured to manage one or more games by storing state information regarding each of the one or more games and updating the state information in response to game events. Each of the server computer systems may be a computer server including a processor and memory storing instructions that, when executed by the processor, cause the processor to perform operations for managing the one or more games. The state information for each game includes, for example, the order of the cards in a virtual deck, the dealer's hand, the players' hands, the players' scores (e.g., chips, credits, or cash), the chips allocated to an insurance bet (if any), and the like.

One or more client computer systems (also referred to herein as player units or player consoles, as discussed in more detail below) of the gaming system 1 may be configured to communicate with one or more of the one or more server computer systems of the gaming system 1 via a computer network such as a local area network and/or the Internet using network adapters (e.g., Ethernet and/or wireless network adapters) of the client and server computer systems. Each of the client computer systems may include a processor and memory storing instructions that, when executed by the processor, cause the processor to perform operations for receiving user (e.g., player) inputs to generate game events, displaying at least some of the game state information (e.g., the dealer's hand, a player's hand, and the player's score) as received over the computer network, and transmitting game events (e.g., player decisions such as "hit" or "stay") over the computer network to at least one of the one or more game servers.

The gaming system 1 includes a dealer 100, which may be a person or a designated role or character of the gaming system 1. Further, it will be appreciated that in some embodiments, the dealer 100 and related "dealing" of cards may be automated. The gaming system 1 further includes one or more player units (or player consoles) 110 in communication with the dealer 100. Although reference is made to a player unit or a player console 110, it will be appreciated that the player console may be a physical console, for example in a casino, a handheld device, such as a smartphone, laptop, tablet, etc., and/or a remote computer, connected to the gaming system 1 via a secure protocol connection (such as transport layer security or TLS) over a computer network such as a local area network and/or the Internet. As such, the player console 110 may be representative of a virtual console in communication with a server.

The player consoles 110 may include a screen 120 and a user interface. For example, the screen 120 and the user interface may be embodied together as a touch screen that receives user inputs. However, embodiments of the present disclosure are not limited thereto, and any suitable means for receiving user inputs may be used, for example, a keyboard, a mouse, etc.

In some embodiments, the deck of cards may be a virtual deck, as discussed above. According to other embodiments, the dealer 100 may deal cards from a physical deck of cards, and may display the cards for any players to view the cards. For example, the dealer 100 may display any dealt cards on a projector, and the gaming system 1 may include software that recognizes each card that is dealt, for example, by scanning the cards, or each card may incorporate an RFID or other indicator which may be scanned to read and store identifying information for each of the cards. In other embodiments, there may be a dealer screen 160, discussed further below.

The screen 120 may display one or more icons 140 relating to gameplay. For example, the icons 140 may include a bet icon 140A, a stay icon 140B, a hit icon 140C, a split icon 140D, a double icon 140E, and an insurance icon 140F. In addition, the screen 120 may include numerical inputs that allow a player to indicate an amount of a bet and/or arrows or another related input that allows the player to set, increase, and/or decrease an amount of a bet for gameplay. The icons 140 may be incorporated into the user interface 130 such that the player may interact with the icons 140 (for example by touching the icons 140 on a touchscreen, clicking the icons using a mouse, etc.). For example, when the player engages the stay icon 140B, a card is not dealt to the player, and when the player engages the hit icon 140C, a card is dealt to the player when the dealer 100 deals a card. The additional icons 140 may correspond to typical gameplay options during traditional blackjack games.

According to some embodiments, a first player 200 may obtain chips or credits, or any suitable form of currency, so that the first player 200 may "buy in" to a hand (or deal) of the game. These chips may be associated with a card having an electronic strip, or a username and password, so that when the first player 200 inserts the card into the player console 110, or logs in to the player console 110, etc., the credits become associated with the first player 200 and the player console 110 used by the first player 200, and are available for betting during gameplay.

Similarly, a second player 210 may obtain chips to buy in to the hand of the game. For convenience of explanation, reference is made herein to the first player 200 and the second player 210, however it will be appreciated that a plurality of players may participate in the game, and that embodiments of the present disclosure are not limited thereto or thereby. Further, in some embodiments, a tournament version of the game may require the entry of a predetermined number of players, for example, 50 players.

The first player 200 may join the game at a first player console 110A and the second player 210 may join the game at a second player console 1106.

The first player 200 may select an amount of credits to use for gameplay during a tournament, for example, 100 credits. The first player 200 may then indicate a number of credits to bet for the first hand to be dealt. For example, the first player 200 may input 5 credits (or chips) and then engage the bet icon 140A to set a bet of 5 credits. Similarly, the second player 210 may indicate a number of credits to bet for the first hand to be dealt. Once all of the players have set their bet amount, a first hand is dealt by the dealer 100.

The dealer 100 deals four cards according to a typical deal between a dealer and one player during blackjack, i.e., two cards to the dealer 100 (referred to herein as a dealer hand) and two cards to the player (referred to herein as a player hand). The first player 200 and the second player 210 are both "dealt" the same cards. The cards that are dealt may be displayed to all players, for example, on a central screen, on a projector, and/or on the player consoles 110 (e.g., the first player console 110A and the second player console 110B). It will be appreciated that one of the cards dealt to the dealer will be displayed, and the other card dealt to the dealer is hidden until the players have each completed their hands. The first player 200 and the second player 210 are both dealt the same cards.

The first player 200 and the second player 210 may concurrently play the player hand. For example, the first player 200 and the second player 210 may engage the hit icon 140B or the stay icon 140C. As discussed further below, in some instances, the first and second players 200, 210 may engage the split icon 140D, the insurance icon 140E, and/or the double icon 140F.

After the first player 200 and the second player 210 select their initial moves, the dealer 100 deals the next card in the deck, which is displayed to the players 200, 210. As discussed further below, if the players 200, 210 still have active hands (or hands that have not busted by totaling more than 21), the dealer continues to deal (or display) successive cards from the deck until all players 200, 210 have either selected the hit icon 140B or busted. The dealer 100 then deals the remaining cards to the dealer hand according to a preset rule system, such as hitting if the dealer hand card total is below 16 and standing if the dealer hand card total is equal to or greater than 17.

Because the first player 200 and second player 210 may make different selections, the cards applied to the dealer hand may vary between the game played with the first player 200 and the game played with the second player 210. As such, the dealer 100 displays as many cards as needed to finish each game with each of the players.

In some embodiments, the player console 110 may display the cards dealt according to the selection made by the player. For example, if the first player 200 engages the hit icon 140B for the first card dealt and the second player 210 engages the stay icon 140C, the first player console 110A may display the card that is dealt next to the player hand, and the second player console 1106 may display the card that is dealt next to the player hand. In some embodiments, all cards dealt by the dealer 100 after the player hand and the dealer hand are dealt may be displayed in succession on the dealer screen. The dealer hand and the player hand may also be displayed on the dealer screen.

Referring to the example hand in FIGS. 2-12, the dealer hand may have a 5 card showing, and the player hand may have a 3 and a 3 dealt. The first player 200 may engage the split icon 140D and bet additional credits. The first player 200 is then dealt the next card in the deck, e.g., a 7. The first player 200 may then engage the double icon 140F and bet additional credits. Another card may then be dealt to the player hand, e.g., a King. The first player 200 then engages the stay icon 140B and ends the player hand as to the first player 200. The dealer 100 then deals the next card in the deck for the split hand, e.g., a 3. The first player 200 may then engage the split icon 140D again, and split the first split hand, and bet additional credits.

The first player 200 may then engage the hit icon 140C and is dealt the next card in the deck, e.g., a 2. The first player 200 may then engage the hit icon 140C again and is dealt the next card in the deck, e.g., a 5. The first player 200 may then engage the hit icon 140C again and is dealt the next card in the deck, e.g., a 6. The first player 200 may then engage the stay icon 140B.

The dealer 100 may then deal the next card to the first player 200 for the second split hand, e.g., an 8. The first player 200 may then engage the double icon 140F and double the bet for the second split hand. The next card in the deck is then dealt to the first player 200, e.g., a 7. The first player 200 may then engage the stay icon 140B.

The dealer 100 then reveals her concealed card, e.g., an A. The dealer then deals the next card in the deck to the dealer, e.g., a 2.

The first player 200 then earns 30 credits (20 for the player hand and 10 for the second split hand which was a push), resulting in a net earning of 5 credits. In some embodiments, the player console 110 may display the final result, e.g., the number of credits earned or lost during the hand.

Meanwhile, the second player 120, when dealt the pair of 3*s*, may engage the hit icon 140B and receive the next card in the deck, the 7. The second player 120 may then engage the hit icon 140B again and receive the next card in the deck, the King. As such, the second player 120 busts and loses the credits bet by the second player 120.

In some embodiments, the credits earned by each of the players may be displayed on the dealer screen such that all players can see the amount of credits belonging to all other players.

As discussed above, according to embodiments, there may be the dealer screen 160 that displays each of the cards as they are dealt. Referring to another example in FIGS. 13-18, the dealer screen may display the player hand, the dealer hand, with one card displayed and one card concealed, and a plurality of boxes (or slots) that display the cards that are subsequently dealt. The dealer screen may also display an image of the deck, face down, and one or more actions relating to the status of gameplay. For example, the dealer screen may have indicators such as "players ready," "player actions complete," "hole card display," "dealer hits," and "deal finished." The "players ready" indicator may be illuminated once all players have made their bets. The "player actions complete" indicator may be illuminated once the players have made their initial gameplay selections (e.g., stay, hit, double). The "hole card display" indicator may be illuminated when all players have finished their selections (with either stay or bust), and the dealer's concealed card is then revealed. The "dealer hits" indicator may be illuminated when the dealer 100 is obligated to hit after the final card is dealt to the player(s), and the next card(s) in the deck are then revealed. The "deal finished" indicator may be illuminated when the hand is complete as to all players.

In one example embodiment, the players hand may include a 2 and a 7, and the dealer hand may include an 8 and the concealed card (or hole card). The first player 200 and the second player 210 may both engage the hit icon 140B. The dealer 100 may then deal the next card, e.g., a 6. The first and second players 200, 210 both have hands that total 15. The first player 200 may engage the hit icon 140B and the second player 210 may engage the stay icon 140C. The dealer 100 may then deal the next card, e.g., a 3. Now, the first player 200 has a hand that totals 18, and the second player 210 has a hand that totals 15. As to the second player 210, the "3" is dealt to the dealer, if the dealer 100 is required to hit.

The first player 200 may then engage the stay icon 140C. Because both players have now stayed, the dealer may reveal the concealed card, e.g., a 5. The dealer 100 has a hand that totals 13, and is therefore obligated to hit. The dealer 100 then reveals another card, e.g., a 6. As to the second player 210, the dealer 100 now has an 8, a 5, a 3, and a 6, which totals 22. Because the dealer busted, the second player 210 wins. As to the first player 200, the dealer 100 now has an 8, a 5, and a 6 (because the 3 was dealt to the first player 200 and not to the dealer 100). As such, the dealer 100 has a hand that totals 19. The dealer 100 therefore wins the game against the first player 100, whose hand totaled 18.

According to embodiments of the present disclosure, the following rules of gameplay may be applied to the gaming system. In some embodiments, the dealer 100 hits (or obtains another card) if her cards total a value of 16, and stays (or does not obtain another card) if her cards total a value of 17. In some embodiments, the dealer 100 may use one deck of cards, such that there is one Ace of Hearts, one Ace of Spades, etc. in gameplay. In some embodiments, the dealer 100 may use more than one deck of cards, such that there are two or more Aces of Hearts, two or more Aces of Spades, etc. in gameplay.

In some embodiments, the house (or the dealer) may choose (or select or designate) a number of players to participate in a game (or in a tournament). The number of players may be fixed, such that a specific number of players must register to play prior to a series of games starting, or may be variable at the house's discretion. In some embodiments, 50 players may be selected as the number of players, but it will be appreciated that fewer than 50 players and more than 50 players may be selected.

The house may choose a number of hands to be played before the tournament begins (or a preset number of hands to be dealt in one game). The number of hands may be fixed for each tournament, or may be variable (for example, variable depending on the number of players involved in the tournament). In some embodiments, each tournament may include 50 hands.

The house may choose (e.g., may limit) the range of credits for each hand, wherein credits are used to place bets. In some embodiments, a number of credits required to participate in a first hand may be less than a number of credits required to participate in a second hand. For example, in some embodiments 1 credit may be required to play in the first hand, and 25 credits may be required to play in the second hand. In some embodiments, 1 to 10 credits may be required to participate in first through fortieth hands, and 25 credits may be required to participate in forty-first through fiftieth hands. In some embodiments, the number of credits may be the same regardless of the hand played. In some embodiments, different players may bet different credit amounts relative to each other. According to embodiments, when a player runs out of credits during a tournament, the player may be precluded from further competing in the tournament.

The house may determine the value of each credit. In some embodiments, each credit may be equal to a minimum table play for traditional blackjack play in a traditional blackjack game. The house may find that there are enough players for occasional tournaments or special events with credits requiring higher buy-ins.

According to embodiments, a side pot may be created with a percentage (e.g., 5%, 10%, etc.) of the credits accumulated when each of the players buys-in to the game (or the tournament). The side pot may be awarded to the player(s) with the most credits at the end of the tournament. If two or more players have the same number of credits then the side pot may be divided equally among the two or more players with the highest number of credits. In some embodiments, when the side pot cannot be evenly divided according to the number of players with the highest number of credits, the house may supplement the side pot such that each player receives the same amount of credits.

According to embodiments, in each tournament, all players may buy in for the same amount of credits and may play the same number of hands, provided that the player has remaining credits at the start of a new hand. Each player may select (or choose) the number of credits to be played at the beginning of a new hand. The players may each have one or more options (e.g., prior to betting), similar to those used in traditional Blackjack, such as Insurance, split, double, hit, and/or stay.

In some embodiments, when a player buys in to a game, a portion of the credits (e.g., a percentage or a predefined amount) may be added to the side pot, with the remaining credits being available for the player to bet on individual hands. For example, the players may buy in to a tournament with 100 credits, and 10 credits may be added to the side pot and 90 credits may remain at the player's disposal for betting during gameplay for each of the hands.

While this disclosure has been described in detail with particular references to some exemplary embodiments thereof, the exemplary embodiments described herein are not intended to be exhaustive or to limit the scope of the disclosure to the exact forms disclosed. It is understood that the drawings are not necessarily to scale. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and their equivalents.

What is claimed is:

1. A gaming system for concurrently playing a modified version of a card game among a dealer and a plurality of players utilizing respective computer systems arranged in a client-server relationship, the gaming system comprising:

at least one server system operable to play the card game as the dealer, the at least one server system comprising:

a processor; and a memory storing instructions that, when executed by the processor, cause the processor to perform operations for managing the card game;

a dealer display in communication with the at least one server system and that displays each of the cards dealt during gameplay; and a plurality of client computer systems operable by respective players, the plurality of client computer systems each comprising:

a display;

a processor; and a memory storing instructions that, when executed by the processor, cause the processor to perform operations for receiving inputs from the plurality of client computer systems to generate game events and transmit game events over a computer network to the at least one server system, the network providing communication between the at least one server system and the plurality of client computer systems and cause the processor to operate with the plurality of client computer systems to:

for a play of the card game:

the dealer dealing a first card to a player hand, a second card to a dealer hand, a third card to the player hand, and a fourth card to the dealer hand, the fourth card being concealed and the first through third cards being exposed, the player hand being allocated to each of the players at the plurality of client computer systems, the display of each of the client computer systems displaying the first card and the third card in association with the player hand and the second card and the concealed fourth card in association with the dealer hand, the dealer display displaying the first card, the second card, the third card, and the concealed fourth card;

determining whether each of the respective players indicated stay or hit on the player hand during a first round of concurrent gameplay and storing information in the memory according to each of the player indications;

if any player indicates hit and after all of the players have indicated stay or hit for the first round, the dealer dealing a fifth card, the dealer display further displaying the fifth card;

when all players have indicated stay, the dealer revealing the fourth card;

the dealer dealing a sixth card and the dealer display further displaying the sixth card if the second card and the fourth card total less than a preselected amount;

applying the fifth card to the player hand for any players who indicate hit in the first round of gameplay, displaying the fifth card in association with the player hand on the display of each client computer system associated with the players who indicate hit in the first round of gameplay, not applying the fifth card to the player hand for any players who indicate stay in the first round of gameplay, applying the fifth card to the dealer hand for any players who indicate stay and when the sixth card and the fourth card total less than the preselected amount, and displaying the fifth card in association with the dealer hand on the display of each client computer system associated with the players who indicate stay;

if at least one player indicates hit after a preceding card is dealt to the at least one player, the dealer dealing additional cards, each subsequent card being applied to the player hand;

if the dealer hand totals less than the preselected amount, the dealer dealing additional cards, each subsequent card being applied to the dealer hand; and comparing a value of cards in the dealer hand to a value of cards in the player hand for each of the players.

2. The gaming system of claim 1, wherein the at least one server system is configured to manage one or more games by storing state information regarding each of the one or more games and updating the state information in response to game events.

3. The gaming system of claim 2, wherein the state information comprises an order of cards in a virtual deck, the dealer hand, the player hand, and an amount of credits belonging to each of the plurality of players.

4. The gaming system of claim 1, the play of the card game further comprising receiving a wager from each of the players.

5. The gaming system of claim 4, wherein the card game comprises a plurality of games played in succession, and wherein a portion of the wager from each of the players is allocated to a side pot.

6. The gaming system of claim 5, wherein the play of the card game further comprises:

storing information relating to an amount of credits earned by each of the players after each of the card games from among the plurality of card games;

comparing a total amount of credits earned by each of the players after all of the card games from among the plurality of card games is complete; and awarding the side pot to one of the players from among the plurality of players with a highest total amount of credits after all of the card games from among the plurality of card games is complete.

7. The gaming system of claim 1, wherein the display comprises a user interface and a screen.

8. The gaming system of claim 7, wherein the user interface comprises a touchscreen.

9. The gaming system of claim 7, wherein the user interface is configured to received one or more user inputs.

10. The gaming system of claim 9, wherein the user inputs comprise a stay input, a bet input, a hit input, a split input, a double input, or an insurance input.

11. The gaming system of claim 9, wherein the user inputs each comprise icons which, when engaged by the respective players, cause the processor of the respective client computer system to send a signal to the at least one server system as one of the game events.

12. The gaming system of claim 1, wherein the card game is Blackjack.

* * * * *